Nov. 25, 1969 R. O. CRIGER 3,479,752

PUBLICATION LAYOUT GUIDE

Original Filed Aug. 29, 1966

INVENTOR

ROBERT O. CRIGER,

BY Yungblut, Melville, Strasser and Foster
ATTORNEYS

United States Patent Office 3,479,752
Patented Nov. 25, 1969

3,479,752
PUBLICATION LAYOUT GUIDE

Robert O. Criger, 2942 Harvard Drive,
Visalia, Calif. 93277

Continuation of application Ser. No. 575,873, Aug. 29, 1966. This application Sept. 20, 1968, Ser. No. 767,040
Int. Cl. G09b *25/00, 29/00;* B42d *1/00*
U.S. Cl. 35—53 5 Claims

ABSTRACT OF THE DISCLOSURE

A publication layout guide comprising a plurality of stacks of sheets, whereby each sheet is provided with various shaped portions thereon representing pictorial and copy locations for the proposed layout. The arrangement of the stacks is such that each lie adjacent to other stacks. This system of display yields a continuous, yet changing, layout guide as new sheets are added or old ones removed.

THE INVENTION BACKGROUND

This application is a continuation of Ser. No. 575,873, filed Aug. 29, 1966, and relates to a unique publication layout guide designed to lower costs and reduce time spent by editors and art people in preparing layouts. While this device is believed geared for use by editors of industrial and trade journals, it is to be understood that it is readily adaptable to other types of magazines or even broadly to advertising layouts. In addition, it may be used in such diverse applications as high school and college yearbooks, newspaper tabloids, industrial news and advertising brochures. It should therefore be apparent that the device made according to the teachings hereinafter has a broad and varied application. For convenience only, the description to follow will be directed to the use of this device in magazine layouts.

Heretofore the task of an editor for a periodical has not been an easy one. Neatness, accuracy and content frequently suffered at the hands of approaching deadlines. Aside from any literary deficiencies, hastily assembled layouts lacked the desired impact with the reader. Some were "too busy," too repetitious or just unappealing. The headaches did not end with the printing, as the next edition had to be prepared with new stories, layouts, etc. each with its own new deadline.

Like an artist, each editor has a preferred approach, or an approach dictated by circumstances, in the manner a layout is planned. While there may be numerous attention-getting devices, an editor for a typical employee magazine or trade journal must rely upon human interest stories, color, hard-hitting headlines, dramatic pictures, etc., displayed in eye-appealing layouts to catch the reader's eye and cause it to move smoothly over the page.

Typically, the layout plans are started during the story-writing and picture-taking tasks. The layout may begin with the existing features and pictures—the remainder filled in at a later date. Others may prepare the entire contents of the proposed edition, then cut it to fit a particular page. But in either case considerable time is lost in reviewing and discussing proposal layouts with photographers and copy writers not readily available. Additionally, if one other than the editor designs a layout, discussions and conferences on proposed modifications are delayed, thus hampering the entire project.

The guides made in accordance to the instant teachings may be used to direct a photographer. For example, it reveals the intended relationship of articles and pictures; hence, the center of interest. Before shooting, the photographer knows the direction of interest, as well as the direction of "action" in the photographs should face. For the copywriters, a feature article may be laid out and gauged to the number of lines allocated.

Moreover, the layout device of the present invention provides a means by which a simple selection of pages will show in detail the layout proposed to another having the same device. For instance, the layout for a large part of an entire edition may be communicated by phone to another across the hall, the city, or the country by the use of these devices.

Accordingly, it is an object of this invention to relieve the editor of much of his present time-consuming chores by providing a magazine layout guide made in accordance with the instant invention.

A further object of this invention is the provision of a magazine layout guide suitable for the future planning of new layouts.

Another object of the instant device is the provision of a means by which potential layouts may be reviewed simultaneously at different locations.

SUMMARY OF THE INVENTION

Briefly, in the practice of this invention, there is provided a plurality of rectangular sheets or leaves hinged at one common side, in the manner of a loose leaf binder. For a typical layout of a magazine page, four of these are selected and each is placed with its edges adjacent two edges of another to form a larger rectangle. Each of the sheets are ruled with horizontal and vertical lines spaced apart in the normal printer's measurement called "picas, and the pica lines are printed in a special blue ink since the type of film used in making the negative of the page is insensitive to blue. Superimposed on each page are representations for an approximate quarter portion of a page layout, the representations being in the form of square, circular and rectangular shapes for pictures, picture captions, headlines, story copy, etc. An important feature of this invention is that on those pages the representations terminate at an edge common to another sheet, the representation will be continued onto the adjoining sheet at the termination point. Thus, if we designate the group of sheets as A–B–C–D [left to right, top and bottom row] and arbitrarily include ten different sheets in each group, we have a potential combination of continuous and different layouts of 10,000. For example, an editor, having selected a set of sheets which make up a layout he likes, can designate it by numerals, e.g. A5–B7–C1–D2, or more simply 5712. This information can then be communicated to another, such as the printer, copywriter, photographer, having a similar device, and each will know readily the other's thoughts concerning the specific layout selected.

Having decided on the particular layout, the design may then be transferred to a transfer sheet, numbered and lined in pica increments in accordance with the pica lines on the layout. It is a simple matter to paste representation shapes (such as reproduction proofs), on the transfer sheet, photograph the sheet and process it in conventional ways.

DETAILED DESCRIPTION OF PREFERRED EMBODIMENT

Figures 1, 2, 3:
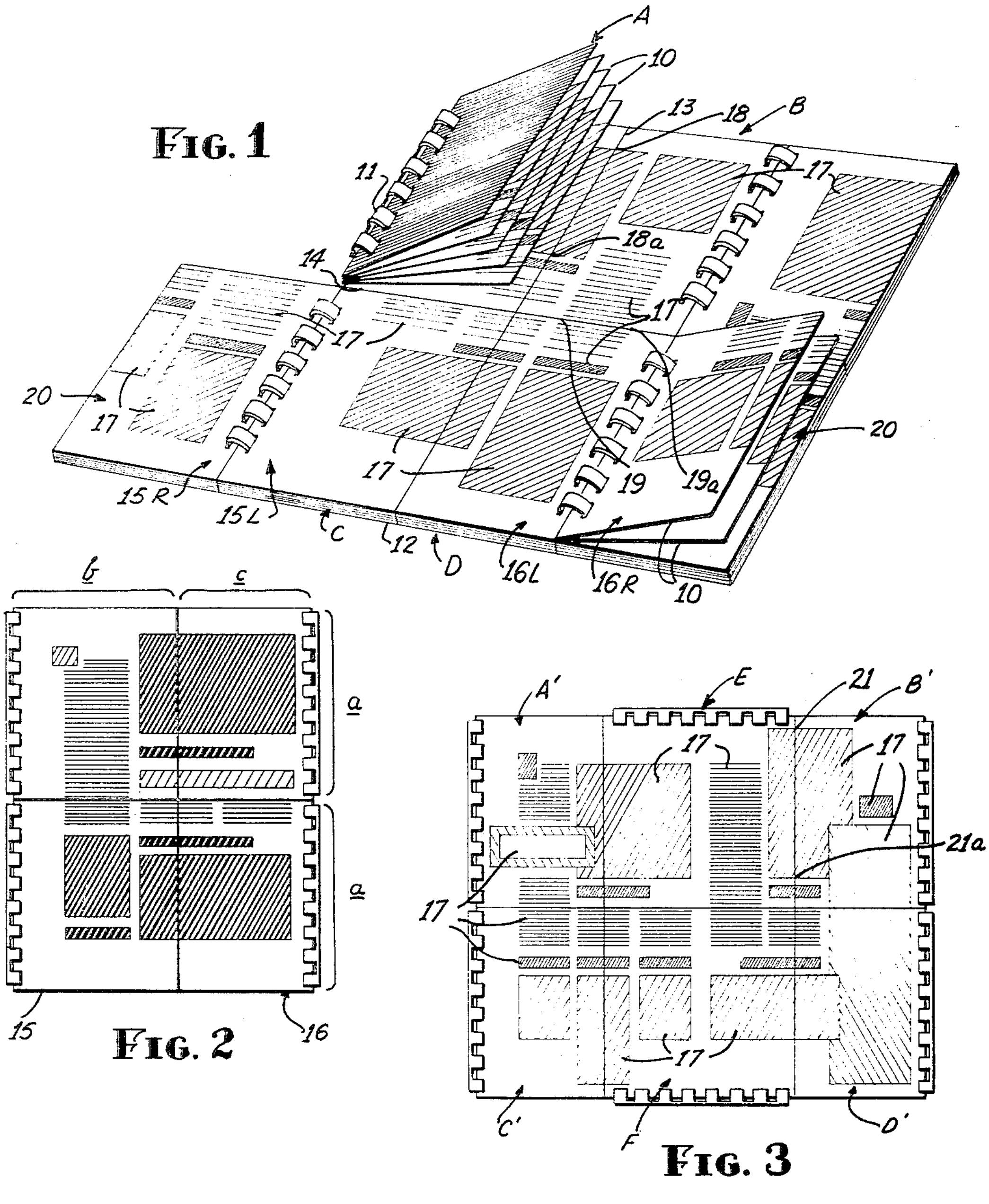
FIGURE 1 is a perspective view of a typical single page magazine layout.
FIGURE 2 is a plan view of the embodiment shown in FIGURE 1 with sheets removed.
FIGURE 3 is a plan view of a modified embodiment illustrating a typical layout for a two-page spread.

Turning now to further details of this invention, it will be observed in FIGURE 1 that the magazine layout guide made in accordance with the instant teaching for a typical single page layout, comprises four groups, A, B, C, D, of rectangular sheets or leaves 10. For convenience and other reasons given hereinafter, each of the four groups of sheets is hinged 11 to a rectangular support board 12. Thus, by this arrangement it may be said that the several sheets of each group are independently movable with respect to separate axes. Further, as the sheets are rendered operative and caused to lie flat against the board 12, each sheet is found adjacent two others at their respective edges, i.e., a vertical edge 13 and a horizontal edge 14. Accordingly, as the sheets are moved to present a new and different display, it will be observed that such movement of one sheet does not interfere with the display presented by an adjacent sheet. And, with either a planned or random movement of the several sheets comprising the total display, the peripheral portions of adjacent sheets will coact with the peripheral portions of the others despite the changes imposed on the display by the movement of the sheets. This then results in the presentation of a continuous series of publication layout designs.

FIGURE 2 is a plan view of a typical single page three column layout. All four of the groups of sheets have the same height, i.e., the dimensions *a* are equal. However, in width the groups differ ($b>c$) to accommodate the border 15L and binding edge 16L. Normally, border 15L exceeds binding edge 16L. Thus the layout depicted in FIGURE 2 is for a left hand page. Each sheet is ruled with horizontal and vertical lines spaced apart in picas, a twelve point measure. It should be understood that other sizes of type may be used without departing from the inventive features of the instant device. Further, since most all pages are designed for two or three columns, the division between adjacent books A and B may be at one or the other edge of the column gutter, the space between columns; or it may intersect the middle column in a three column page.

The unique arrangement of indicia or printing representations, indicated generally at 17, on the face of each sheet form a critical part of this invention. Where any representation, which may be a pictorial block, copy block, etc., terminates at the edge 13 or 14 common to two grounds of sheets, a smooth transition or continuation of the representation occurs. For example, locations 18 and 18*a* are common termination points for a certain representation on each sheet in groups A and B. Further, locations 19 and 19*a* are common termination points for certain representations on the sheets of groups B and D. However, while each sheet of a given group has this common feautre the overall design of the sheet is unique from the others. Hence, the potential combinations of different but continuous page layouts are limited only by the product of the total sheets employed in each group.

It will be further noted in FIGURE 1 the printing or representations on the reverse side 20 of the respective sheets. These are illustrated on the outer sheets turned away from the edge 13. By flipping or rotating said sheets an additional 180°, or a total of 360°, such that they lie contiguous with the under side of board 12, and flipping said board 180°, a right hand page layout guide becomes available with the border and the binding edge 15R and 16R respectively reversed.

With the device constructed in accordance with the instant teaching, the layout for an entire book is potentially available. Since it is not unusual for magazines of the type for which this device may be used to desire and utilize two page spreads, a system of pages such as illustrated in FIGURE 3 may be employed. This merely incorporates two different groups of sheets, namely E and F. It should be apparent that these new added books have three of their edges common with three other books or groups. Thus location points such as 21 and 21*a* may appear on up to three edges of the sheets in the two middle groups. Since there is no "opposite" to a two page spread, the indicia or printing representation will be superimposed on the pica lines of only the face side.

While each embodiment has been shown with the sheets hinged to one another, or to a common board, it should be understood this is merely preferred and that each group of sheets may be handled individually like a deck of cards or fastened by other conventional means.

These and other modifications may be made to this device without departing from the spirit and scope of this invention, and therefore no limitation is intended to be imposed herein except those set forth in the following claims.

The embodiments of the invention in which an exclusive property or privilege is claimed are defined as follows:

1. A publication layout guide device comprising a base member of rectangular shape, at least four stacks of sheets of rectangular shape, all sheets in any given stack being of the same size, the edges of said stacks in abutting relationship being substantially congruent with said base member, said stacks, along their edges which overlie the edges of said base member, being hingedly secured to said base member, not more than half of said number of stacks being hinged to the same edge of said base member, the several sheets of each stack being coded and carrying different indicia of blocks of a complete layout design, some of said sheets carrying parts of different lay out blocks which are completed when matched with other sheets containing the remainder of said blocks, said indicia being arranged such that the layout design portion on each sheet of any one stack is compatible with the layout design portion of each sheet of each of the other stacks, whereby all possible combinations of sheets of all stacks present a complete and compatible layout design, identifiable and reproducible by said codes.

2. The device as claimed in claim 1 wherein there are four stacks of sheets.

3. The device as claimed in claim 1 with the reverse side of each of said sheets having indicia uniquely arranged thereon, thereby providing for a layout guide to supplement the former guide.

4. The device as claimed in claim 1 wherein there are six stacks, each comprising a plurality of sheets.

5. The device as claimed in claim 4 whereby the stacks are arranged in two rows of three each.

References Cited

UNITED STATES PATENTS

| | | |
|---|---|---|
| 698,603 | 4/1902 | Weiderseim. |
| 2,291,257 | 7/1942 | Rider. |

FOREIGN PATENTS

| | | |
|---|---|---|
| 623,611 | 3/1927 | France. |
| 485,994 | 5/1938 | Great Britain. |
| 565,438 | 11/1944 | Great Britain. |
| 307,657 | 8/1955 | Switzerland. |

EUGENE R. CAPOZIO, Primary Examiner

HARLAND S. SKOGQUIST, Assistant Examiner

U.S. Cl. X.R.

281—16